US007849156B2

(12) United States Patent
Alpern et al.

(10) Patent No.: US 7,849,156 B2
(45) Date of Patent: Dec. 7, 2010

(54) METHOD, APPARATUS AND COMPUTER PROGRAM PRODUCT FOR DISCOVERING AND PRIORITIZING PATTERNS OF COMPONENT USAGE IN A VIRTUAL APPLICATION CONTAINER FOR ENHANCING PREFETCHING

(75) Inventors: Bowen L. Alpern, Peekskill, NY (US); Glenn Ammons, Albany, NY (US); Vasanth Bala, Rye, NY (US); Todd W. Mummert, Danbury, CT (US); Darrell Christopher Reimer, Tarrytown, NY (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 11/757,477

(22) Filed: Jun. 4, 2007

(65) Prior Publication Data

US 2008/0301316 A1    Dec. 4, 2008

(51) Int. Cl.
*G06F 15/16* (2006.01)
*G06F 15/173* (2006.01)
(52) U.S. Cl. .............. 709/217; 709/218; 709/228; 709/229; 709/224; 709/227
(58) Field of Classification Search .......... 709/224, 709/227, 228, 229, 217, 218
See application file for complete search history.

(56) References Cited

U.S. PATENT DOCUMENTS

| 6,085,193 | A  | * | 7/2000  | Malkin et al. ............... 707/10 |
| 6,460,036 | B1 | * | 10/2002 | Herz ............................ 707/748 |
| 6,542,964 | B1 | * | 4/2003  | Scharber ...................... 711/122 |
| 6,622,168 | B1 | * | 9/2003  | Datta .......................... 709/219 |
| 7,058,536 | B2 | * | 6/2006  | Gabriel ........................ 702/123 |
| 7,062,567 | B2 |   | 6/2006  | Benitez et al. ............... 709/231 |
| 7,130,890 | B1 | * | 10/2006 | Kumar et al. ................. 709/218 |
| 7,165,147 | B2 | * | 1/2007  | Ting et al. ................... 711/137 |
| 7,430,586 | B2 | * | 9/2008  | Bradshaw et al. ............ 709/217 |
| 7,483,871 | B2 | * | 1/2009  | Herz ............................. 707/2 |
| 7,512,615 | B2 | * | 3/2009  | Bordawekar et al. ......... 707/101 |
| 7,624,160 | B2 | * | 11/2009 | Henderson et al. ........... 709/219 |
| 7,636,801 | B1 | * | 12/2009 | Kekre et al. .................. 710/31 |
| 2002/0165911 | A1 | * | 11/2002 | Gabber et al. ............... 709/203 |

(Continued)

OTHER PUBLICATIONS

PDS: A Virtual Execution Environment for Software Deployment, Bowen Alpern, et al., VEE '05, Jun. 11-12, 2005, Chicago, Illinois, USA, 11pgs.

*Primary Examiner*—Kenny S Lin
*Assistant Examiner*—Hieu Hoang
(74) *Attorney, Agent, or Firm*—Harrington & Smith

(57) ABSTRACT

Disclosed is a method, computer program product and a server unit of a virtual execution environment having at least one client. The server unit includes a network interface for conducting bidirectional communications with the at least one client and a control unit configured to determine, for individual ones of positions in a virtualized execution of an application, those components that are required at each position; to establish a pseudo-distance between the positions in the virtualized execution of the application; and to identify components that are candidates for prefetching as those components required at one or more positions that are proximate to a current position. The pseudo-distance between positions is indicative of an urgency of prefetching candidate components for regulating an amount of resources devoted to the prefetching of components.

15 Claims, 3 Drawing Sheets

U.S. PATENT DOCUMENTS

| | | | |
|---|---|---|---|
| 2003/0005134 A1* | 1/2003 | Martin et al. | 709/229 |
| 2003/0009538 A1* | 1/2003 | Shah et al. | 709/219 |
| 2003/0115346 A1* | 6/2003 | McHenry et al. | 709/229 |
| 2003/0126116 A1* | 7/2003 | Chen et al. | 707/3 |
| 2004/0133747 A1* | 7/2004 | Coldewey | 711/137 |
| 2005/0102256 A1* | 5/2005 | Bordawekar et al. | 707/1 |
| 2006/0047974 A1 | 3/2006 | Alpern et al. | 713/191 |
| 2006/0080401 A1* | 4/2006 | Gill et al. | 709/217 |
| 2007/0067382 A1* | 3/2007 | Sun | 709/203 |
| 2007/0088919 A1* | 4/2007 | Shen et al. | 711/154 |
| 2008/0235225 A1* | 9/2008 | Michele et al. | 707/6 |

* cited by examiner

METHOD, APPARATUS AND COMPUTER PROGRAM PRODUCT FOR DISCOVERING AND PRIORITIZING PATTERNS OF COMPONENT USAGE IN A VIRTUAL APPLICATION CONTAINER FOR ENHANCING PREFETCHING

STATEMENT OF GOVERNMENT RIGHTS

This invention was made with Government support under Contract No.: NBCH3039004 (DARPA) awarded by the Defense, Advanced Research Projects Agency. The Government has certain rights in this invention.

TECHNICAL FIELD

This invention relates generally to data processors and data processing methods and, more specifically, relates to data processor virtualization procedures and apparatus in the context of application virtualization and the modeling of application behavior as it relates at least to prefetching techniques.

BACKGROUND

Virtual machines, particularly those that attempt to capture an entire machine's state, are increasingly being used as vehicles for deploying software, providing predictability and centralized control. The virtual environment provides isolation from the uncontrolled variability of target machines, particularly from potentially conflicting versions of prerequisite software. Skilled personnel assemble a self-contained software universe (potentially including the operating system) with all of the dependencies of an application, or suite of applications, correctly resolved. They then have confidence that this software will exhibit the same behavior on every machine, since a virtual machine monitor (VMM) will be interposed between it and the real machine.

Virtualization (system and application) technology has been gaining widespread commercial acceptance in recent years. System virtualization allows multiple operating system (OS) stacks to share common hardware resources such as memory and CPU. System virtualization is generally implemented as a mediation layer that operates between the OS and the hardware. Application level virtualization technologies allow multiple application stacks to share a common OS namespace, such as files and registry entries. Application level virtualization is generally implemented as a mediation layer that operates between the application processes and the OS. With system virtualization, an OS stack can be given the illusion that required hardware resources are available, whereas in reality they may be shared by multiple OS stacks. With application virtualization, an application can be given the illusion that its files and registry entries are exactly where it expects them to be on the host machine, whereas in reality multiple application install images may be sharing the same locations in the namespace.

General reference with regard a virtual execution environment (one known as a Progressive Deployment System (PDS)) may be made to VEE '05, Jun. 11-12, 2005, Chicago, Ill., USA, "PDS: A Virtual Execution Environment for Software Deployment", Bowen Alpern, Joshua Aurbach, Vasanth Bala, Thomas Frauenhofer, Todd Mummert, Michael Pigott.

The two types of virtualization technology (i.e., system and application) operate at different levels of the stack, and their value propositions are complimentary. System virtualization enables encapsulation of the state of a complete OS and applications software stack within a virtual system container, while application virtualization enables encapsulation of the state of an application stack only within a virtual application container. Both types of virtualization allow their respective containers to be deployed and managed as an appliance, i.e., as a pre-installed and pre-tested environment within a secure region that is isolated from other stacks that share the same environment. This has significant commercial value from an IT management standpoint, since appliances provide greater robustness and security assurances than conventional install-based methods of deployment.

Virtual application containers can be delivered as a stream (over a network from a server to the host) as the application executes. Streaming is the overlap of delivery of a virtualized application (and its container) with the execution of the application (in its container). Streaming is accomplished by decomposing an application (and its container) into components. Components are brought to the host machine on demand (as they are required) or they are prefetched (before they are required). Prefetching reduces the application latency due to the transfer of components from a server to the host.

To be effective prefetching should accomplish at least three goals. First, it should identify good candidate components for transfer. Second, it should provide an estimate of the urgency of such a transfer. And, third, it should not consume excessive system resources (such as bandwidth between the server and host, space on the host, CPU cycles on the host, bandwidth between the host and a local disk, as non-limiting examples).

In general prefetching uses a model that encodes patterns of component utilization that are derived from observations of independent application behaviors. However, such observations are difficult to obtain and must themselves be treated as scarce resources.

Software execution typically requires components in bursts: i.e., a sequence of components that are all required (in order) in a short time span. One simplistic approach to prefetching would be to identify such bursts and bundle them into a single package. As soon as the first component is required, the entire package (all components of the burst) is transferred. This allows the transfer of all but the first component of the burst to be overlapped with the execution that is enabled by the arrival of the first component until the point that the last component is required. However, one drawback of this approach is that first component is fetched on demand, with the application waiting idly until the first component arrives. Another drawback is that the time required to transfer the remaining data in the burst may far exceed the execution time of the burst.

A more effective approach would attempt to prefetch (at least) a prefix of a burst before its first component is required. An advantage in this approach is that there is much more time between bursts than there is within them. One difficulty associated with this approach is that it is much harder to predict the order of bursts that it is to predict their contents. Thus, the use of this approach to prefetching can result in transferring the prefixes of many bursts before it is apparent which burst will occur next. This could obviously consume system bandwidth and resources needlessly.

Another consideration to be kept in mind with respect to prefetching is its impact on the performance of the virtualized execution. The two processes often compete for scarce system resources. This competition can be direct as when the application needs to share the channel connecting the client to the server, or to use another channel that shares some underlying resource, or to use another system resource, such as a disk, that may also involved in the prefetching operation.

Reference can be had to U.S. Pat. No. 7,062,567, Intelligent Network Streaming and Execution System for Conventionally Coded Applications. As is stated in col. 21, lines 29-48:

"Static and Dynamic Profiling—With respect to FIG. 21, since the same application code is executed in conjunction with a particular Stream Application Set 2103 each time, there will be a high degree of temporal locality of referenced Application File Pages, e.g., when a certain feature is invoked, most if not all the same code and data is referenced each time to perform the operation. These access patterns can be collected into profiles 2108, which can be shipped to the client 2106 to guide its prefetching (or to guide server-based 2105 prefetching), and they can be used to pre-package groups of Application File Pages 2103, 2104 together and compress them offline as part of a post-processing step 2101, 2102, 2103. The benefit of the latter is that a high compression ratio can be obtained to reduce client latency without the cost of runtime server processing load (though only limited groups of Application File Pages will be available, so requests which don't match the profile would get a superset of their request in terms of the pre-compressed groups of Application File Pages that are available)."

However, no details are provided as to how "access patterns can be collected into profiles".

U.S. Pat. No. 7,062,567 discusses the idea of applying predictive caching techniques, such as those that have been discussed in the context of distributed file systems, to the context of streaming software. Evident disadvantages of this approach include, but are not limited to: it can only exploit very high frequency temporal locality (correlations between different "features" are ignored), candidates for prefetching are not graded for urgency (all candidates are equally urgent), and the prefetch algorithm apparently does not consider contention for scarce system resources.

SUMMARY

The foregoing and other problems are overcome, and other advantages are realized, in accordance with the exemplary embodiments of this invention.

In a first aspect thereof there is provided a method that comprises, for individual ones of positions in a virtualized execution of an application, determining those components that are required at each position; establishing a pseudo-distance between the positions in the virtualized execution of the application; and identifying components that are candidates for prefetching as those components required at least one position that is proximate to a current position.

In a second aspect thereof there is provided a tangible computer-readable storage medium that stores data representing program instructions, the execution of which result in operations that include, for individual ones of positions in a virtualized execution of an application, determining those components that are required at each position; establishing a pseudo-distance between the positions in the virtualized execution of the application; and identifying components that are candidates for prefetching as those components required at least one position that is proximate to a current position.

In another aspect thereof there is provided a server of a virtual execution environment that comprises at least one client. The server includes a network interface for conducting bidirectional communications with the at least one client and a control unit configured to determine, for individual ones of positions in a virtualized execution of an application, those components that are required at each position, to establish a pseudo-distance between the positions in the virtualized execution of the application; and to identify components that are candidates for prefetching as those components required at least one position that is proximate to a current position, where the pseudo-distance between positions is indicative of an urgency of prefetching candidate components for regulating an amount of resources devoted to the prefetching of components.

In a further aspect thereof there is provided a server of a virtual execution environment that comprises at least one client. The server includes means for forming traces of client requests for components during execution of an application; means for constructing an approximate pseudo-distance between components; means for performing hierarchical clustering to arrange clusters of client requests into a logical construction have the form of a binary tree; and means for using at least one heuristic to partially flatten that tree so that the distance between leaves of the resulting tree approximates the pseudo-distance between components.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION

The exemplary embodiments of this invention provide a technique for building a model of application behavior that can be used for effective prefetching.

Figure 1:
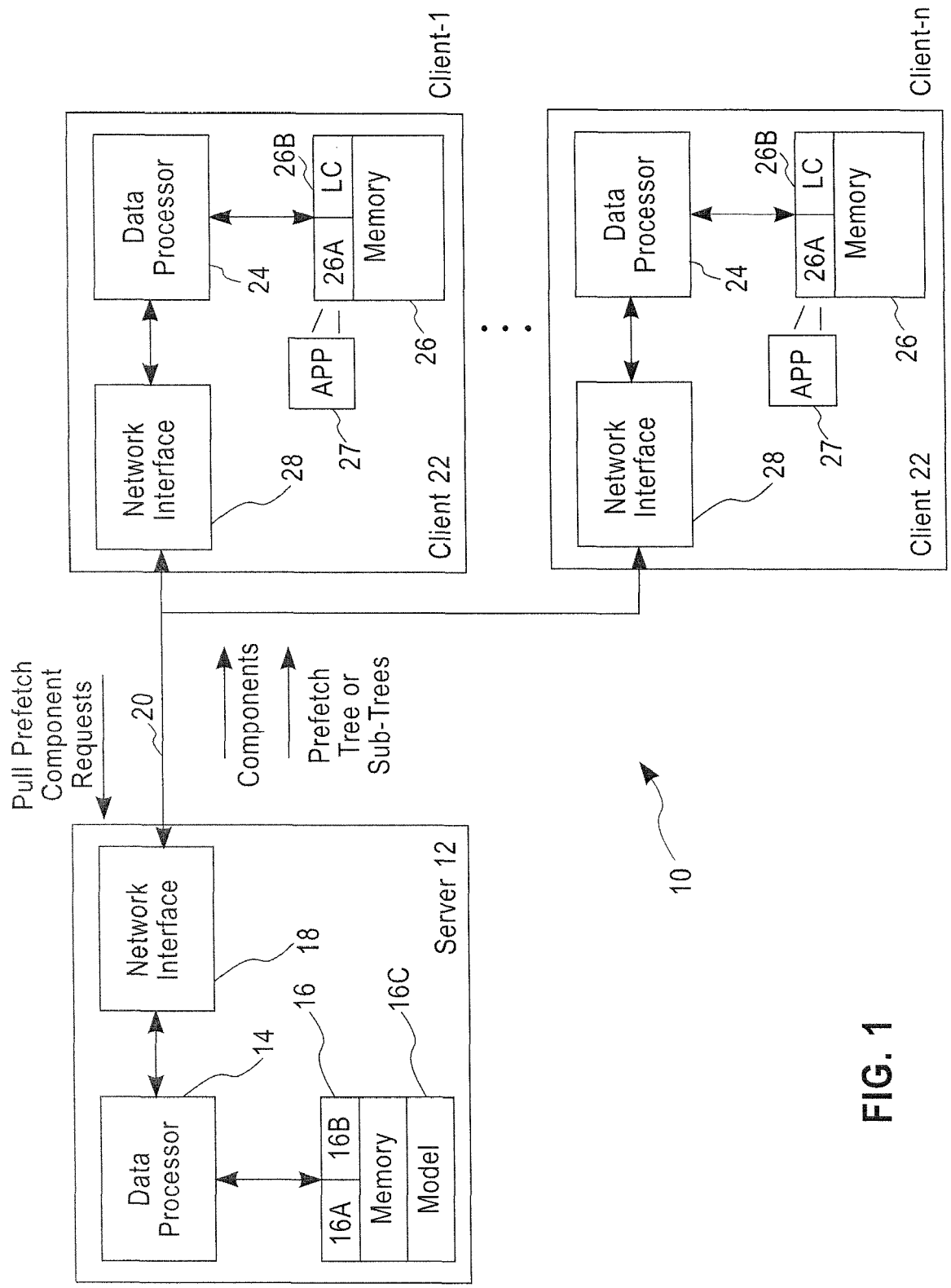
FIG. 1 is a system level block diagram of a virtualization environment containing a server and a plurality of clients that operate in accordance with exemplary embodiments of this invention.

FIG. 1 is a block diagram of a data processing system embodying a virtualization environment 10 that is suitable for use in implementing the exemplary embodiments of this invention. System 10 includes a server 12 that includes at least one control unit, such as at least one data processor 14 that is bidirectionally coupled to a memory 16. The memory 16 may be based on any suitable memory technology, and may include one or more magnetic rotating memory or tape memory, optical memory and semiconductor-based memory, as non-limiting examples. The memory 16 may be viewed as a tangible, computer-readable storage medium that stores data representing at least a computer program 16A containing program instructions for operating the data processor 14 to implement methods of this invention, as well as data 16B for use by the data processor 14 when executing the methods of this invention. The memory 16 is assumed to store, such as in data area 16B, components that are prefetched (or fetched on demand) by applications running in clients 22. The server 12 also includes a network interface 18 for bidirectionally coupling to at least one data communication network 20. Also coupled to the network 20 is at least one, and typically a plurality of the clients 22 (client_1, ... client_n). Each client 22 may be assumed to also include at least one data processor 24 that is bidirectionally coupled to a memory 26, as well as a corresponding network interface 28. The memory 26 is assumed to include a computer program 26A implementing at least one application 27 that executes in a virtualized environment. The server 12 is assumed to be a server of the components of applications 27 executed by the clients 22, and to be responsible for the prefetching of these components from the memory 16 in accordance with the exemplary embodiments of this invention. (In an alternative embodiment, the server merely responds to requests for components and its clients are responsible for prefetching.) The application 27 may be any suitable application, such as a data base application or an image rendering application, as non-limiting embodiments that is suitable for being executed in a virtual machine-type of environment.

The exemplary embodiments of this invention enable the server 12 of components of an application 27 to convert requests for the components that it receives (possibly augmented with additional information) from clients 22 into a model 16C of application 27 behavior that can subsequently be transmitted incrementally to at least new clients 22, allowing these clients to effectively prefetch components as they execute the application 27.

Traces of client requests (either to the server 12 or to a client local cache (LC) 26B) are used to construct an approximate pseudo-distance between components. Hierarchical clustering may then be used to arrange clusters (of client requests) into a logical construction have the form of a binary tree 30 (shown in FIG. 2 and described in detail below). Heuristics may then be used to at least partially flatten the binary tree 30 into a (not necessarily binary) tree 40 so that the distance between leaves of the tree 40 more closely approximates the pseudo-distance between components.

Figure 2:
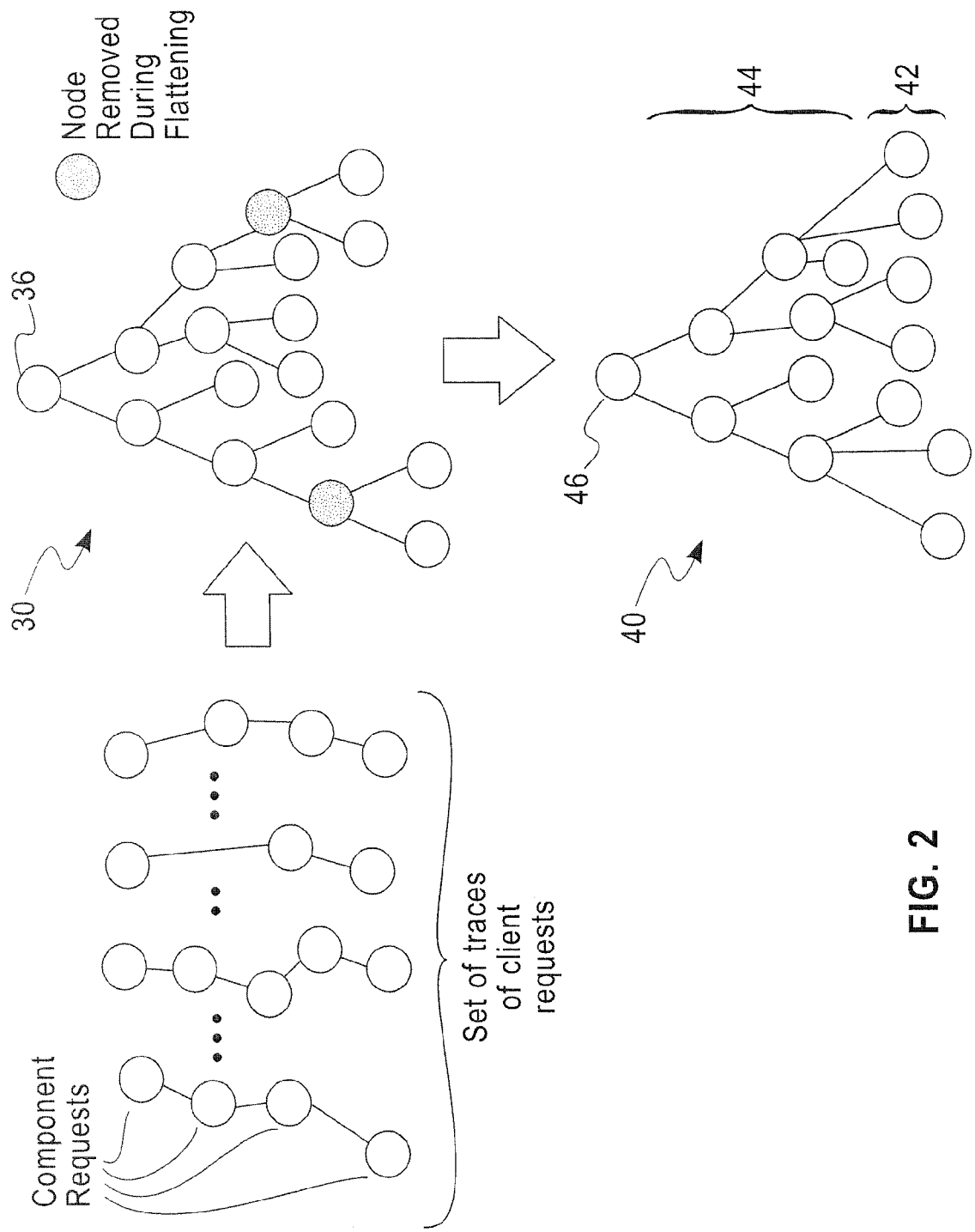
FIG. 2 is a simplified depiction of a prefetch tree structure constructed from a set of traces of client component requests.

As shown in FIG. 2, the exemplary binary tree 30 has been partially flattened by removal of certain interior nodes, and by connecting the child nodes of a removed interior node to the parent node of the removed node. As such, the tree 40 can be viewed as being no longer binary in form.

The tree 40 is linear in the number of components, and allows the client 22 to anticipate components that will be needed in the very near future and to prefetch them. It also induces a partial ordering of the components that permits other components that may be needed soon, but not immediately, to be prefetched with less urgency.

The use of the exemplary embodiments of this invention allows less than high frequency temporal locality among component requests to be effectively exploited to reduce the latency of transferring an application 27 to a client 22 while the client executes the application 27.

In operation, the server 12 builds the model 16C of application 27 component usage based on the requests it receives for components (or such a model is built offline from traces however arrived at), and delivers this model to at least new clients 22 who use it to prefetch those components as they execute the application 27. Alternatively, the server 12 may push the components onto the clients 22 before they are requested. In this case the server 12 may use usage information obtained at or from the clients 22 in forming the model 16C. The model 16C may be formed from traces of a running application 27. The model 16C identifies candidate components to prefetch, as well as providing an indication of how urgently the candidate components will likely be needed. The resources devoted to delivering candidates may be rationed according to their urgency.

The exemplary embodiments of this invention operate by identifying "positions" in a virtualized execution of an application 27, by determining those components that are required at each position, and by establishing a "pseudo-distance" (which need not be symmetric, or need not satisfy the triangle inequality) between positions in the virtualized execution of the application 27. The pseudo-distance is a predetermined composite measure of the likelihood of moving from one position in the virtualized execution of the application 27 to another position in the virtualized execution of the application 27 in some period of time (preferably some short period of time). Alternatively, the pseudo-distance between two positions p and q could be defined in a way that reflects both the approximate likelihood that q will occur in an execution that contains an earlier p, and an estimation of the expected time between the occurrences of p and q in such executions. Components are candidates for prefetching if they are required at one or more positions that are proximate to a current position. The pseudo-distance between positions establishes the urgency of candidate components, and may be used to regulate the amount of the channel (e.g., the network 20) between the client 22 and the server 12 (or more generally the amount of server/client/system resources) that is to be devoted at any given time to the prefetching of components.

A "natural" position is a point at which a virtualized execution of an application 27 by the client 22 requires a new software component. There are basically two types: all requests for components, or only those that cannot be satisfied from a local component cache of the client 22. There are tradeoffs in determining which type to use: the former is more precise and provides optimum results, but may require more overhead to track.

Note that other definitions of "position" are possible, particularly if the virtualization engine is explicitly informed as to when an application 27 changes phase. In addition, sequences of requests may be employed to disambiguate requests that actually represent different positions. This embodiment may be of particular important where components are identified by a cryptographic digest of their contents (or by some other means whereby different components with identical content are given the same name), and the same digest can identify different components, e.g., copyright files, that happen to have the same contents. This embodiment may be generalized to making position states in a Markov model whose input symbols are requests for components.

In general, if a position is taken as a request for a component, then the set of components needed at a position is the singleton comprising the requested component.

One embodiment for determining an appropriate pseudo-distance for an application 27 exploits traces of virtualized execution of the application 27 with all of its components locally available. Each trace in this case represents a sequence of entries containing component identifiers (which may be a cryptographic digest of the component's content), and a timestamp indicating when the component had been first requested. A trace that contains an entry for each component in an application 27 is considered herein to be complete, otherwise it is partial. In that independent traces may be difficult to obtain, they may be regarded as a scarce resource.

Note that one with knowledge in the art will understand that there are other techniques for obtaining equally useful traces, and that there are a number of suitable methods of generating application traces. As one non-limiting example file system accesses may be monitored during the execution of a conventionally installed application.

A pseudo-distance may be derived from a set of traces by taking the pseudo-distance from p to q, pd(p, q), to be an average of the logs of the difference in timestamps (preferably in machine cycles) of p and q in those traces that contain both p and q, with p preceding q. If there are no such traces, the pseudo-distance from p to q is not defined (or may be taken to be infinity or some large constant value). The initial pseudo-distance may be adjusted so that no pseudo-distance is negative, and so that it is zero only from a position to itself.

The server 12 may build up a pseudo-distance based on the requests it receives from clients 22 and the times of arrival of the requests. Alternately, the requests may be time-stamped by the clients 22. The clients 22 may also supply the server 12 with histories of requests that were satisfied in their local caches 26B. In any event it is assumed that the server 12 builds up the traces of the execution of the application 27 on the various clients 22, using one (or both) of the received requests from the clients 22 and the histories of requests satisfied in the local caches 26B or by some other means, and establishes a pseudo-distance based on those traces.

Given a pseudo-distance, the component(s) to prefetch are those needed at the nearest position, or at one or more other nearby positions, that are not already resident at the client 22. If a position requiring those components is quite near (in pseudo-distance), the components may be prefetched urgently. If the position is farther away, the prefetch channel may be left idle for a time allowing the application 27 execution unfettered access to those resources it would otherwise have to share with prefetch activity.

It is noted that there are several considerations when relying directly on precise pseudo-distances to drive the prefetch mechanism. First, pseudo-distances can be large: quadratic in the number of components in the application 27. As such, it may be impractical for either the client 22 or the server 12 to store them in fast (expensive) memory. Furthermore, transferring a pseudo-distance from the server 12 to the client 22 would utilize channel resources on the network 20 that might better be used for transferring the components. In addition, a large number of traces would be required to construct an accurate pseudo-distance as a value would be required for every pair of positions, even if they are distant from one another and (each individually) fairly rare.

However, the inventors have determined that precise pseudo-distances are generally not required to make prefetch decisions and, as a result, the ensuing description presents embodiments for summarizing imprecise pseudo-distance information and the use of the summaries to drive effective prefetching. The summary information is linear in the number of components in the application 27. It may also be decomposed so that only a portion need be kept in fast memory at any time and so that it may be transferred incrementally.

In accordance with the exemplary embodiments of this invention, and referring again to FIG. 2, the binary tee 30 is constructed based on the pseudo-distance derived from traces, and the binary tree 30 may then be at least partially flattened to yield the prefetch tree 40. The prefetch tree 40 is constructed having positions as the leaves 42. The internal nodes 44 of the tree 40 are intended to represent a hierarchy of phases of execution of the application 27, with the descendants of a given node representing positions or sub-phases within the phase. Proximity of positions in the pseudo-distance sense is approximated by closeness in the tree 40. The tree 40 may be assumed to comprise at least a portion of the model 16C maintained at the server 12.

Each node of the tree 40 (logically) maintains the set of components required by its descendants. When a virtualized execution of the application 27 reaches a new position any components required at that position are transferred on demand (if they are not already on the client 22). The components maintained at the parent node of the new position are those most likely to be required in the near future, and any of these components that are not yet on the client 22 are prefetched with high priority.

Those components not maintained at the parent node, but maintained at the grandparent node, are those next most likely to be needed soon and are scheduled to be prefetched with a lower priority, and so on, up the tree 40 in a direction from the leaf 42 to the root 46.

The set of components maintained at a node are ordered when they are scheduled to be prefetched. Various ways to achieve the ordering are within the scope of the exemplary embodiments of this invention. For example, a global order may be obtained by comparing average (or minimum or weighted average) rank in a set of traces: where the components that tend to come earlier in the traces being lower in the order than those that tend to come later. Orders relative to a particular position can be similarly obtained by first deleting the prefix of each trace ending in that position. Orders relative to a set of positions can be obtained by combining the orders obtained for each of the members of the set. Some priority may also be given to those components that occur in more traces than others. To obtain an order most likely to ensure prefixes of bursts are on the client 22 when the burst begins, the merge of a parent node may be formed as a round robin merge of the orders of its children (or by a variant that uses one of the above orders to order the candidates in each round).

The prefetch tree 40 may be decomposed into a tree of sub-trees. Although only the sub-tree containing the current position need be present on the client 22 for a highest priority pull prefetching to occur, other sub-trees on the path from the leaf 42 to the root 46 may be used for lower priority prefetching from the client 22. The leaves of internal sub-trees may contain a fixed-sized prefix of the ordered list of the components it maintains. When this prefix is exhausted, the child sub-tree is transferred. Sub-trees themselves can be prefetched as if they were components of the application 27. Just as only a subset of the sub-trees need be on the client 22 to enable pull prefetching, only a sub-set need be in the fast memory of either the client 22 or the server 12.

Described now is an exemplary and non-limiting technique to construct the binary prefetch tree 30 from (possibly imprecise) pseudo-distances. First, one should note that a pseudo-distance between individual requests can be extended to operate on disjoint sets of individual requests in a multitude of natural ways. For example, the pseudo-distance between two sets may be taken to be the maximum, the minimum, or some weighted average, of the pair-wise pseudo-distances.

The binary tree 30 may be constructed from a pseudo-distance (suitably extended to handle disjoint sets) by hierarchical clustering as follows. The application 27 positions are placed as singleton nodes in a set. Repeatedly, the closest two nodes are removed from the set and replaced by a new node that has the removed nodes as its children. When the set contains only a single node, it is the root 36 of the desired binary tree 30. Heuristics are preferably used to obtain from the binary tree 30 the more general tree 40 that better reflects the phase structure of the execution of the application 27.

One such heuristic exploits two different procedures for extending pseudo-distances to disjoint sets. Assume that the binary tree 30 is built using the maximum-pseudo-distance (the pseudo-distance between two sets is taken to be the maximum of the pair-wise distances). Thus, the maximum pseudo-distance between positions in a node and positions in its siblings is greater that the maximum pseudo-distance between any two positions within the node. However, it may be that some position in the node is closer to some position in a sibling than the maximum pseudo-distance between positions within the node (or that the maximum pseudo-distance between the node and a sibling is within some function of the maximum pseudo-distance between positions within node). In this case, the node is dissolved and its children become children of its parent. Note that it may be useful to impose an arbitrary maximum to the number of children allowed to a node.

While the above heuristic works well in the interior (34) of the binary prefetch tree 30, it is not applicable to the leaves 32. At the fringe of the binary tree 30, the following heuristic may be applied: dissolve a node whose children are all leaves if the node's parent has no great grandchildren nodes, and if one of the children of the node is almost as close to a descendant of its grandparent (an uncle or cousin, not a sibling) as it is to a sibling. Determination of "almost as close" can be taken to mean within a small additive or multiplicative factor (or a combination of the two) as a non limiting example.

Figure 3:
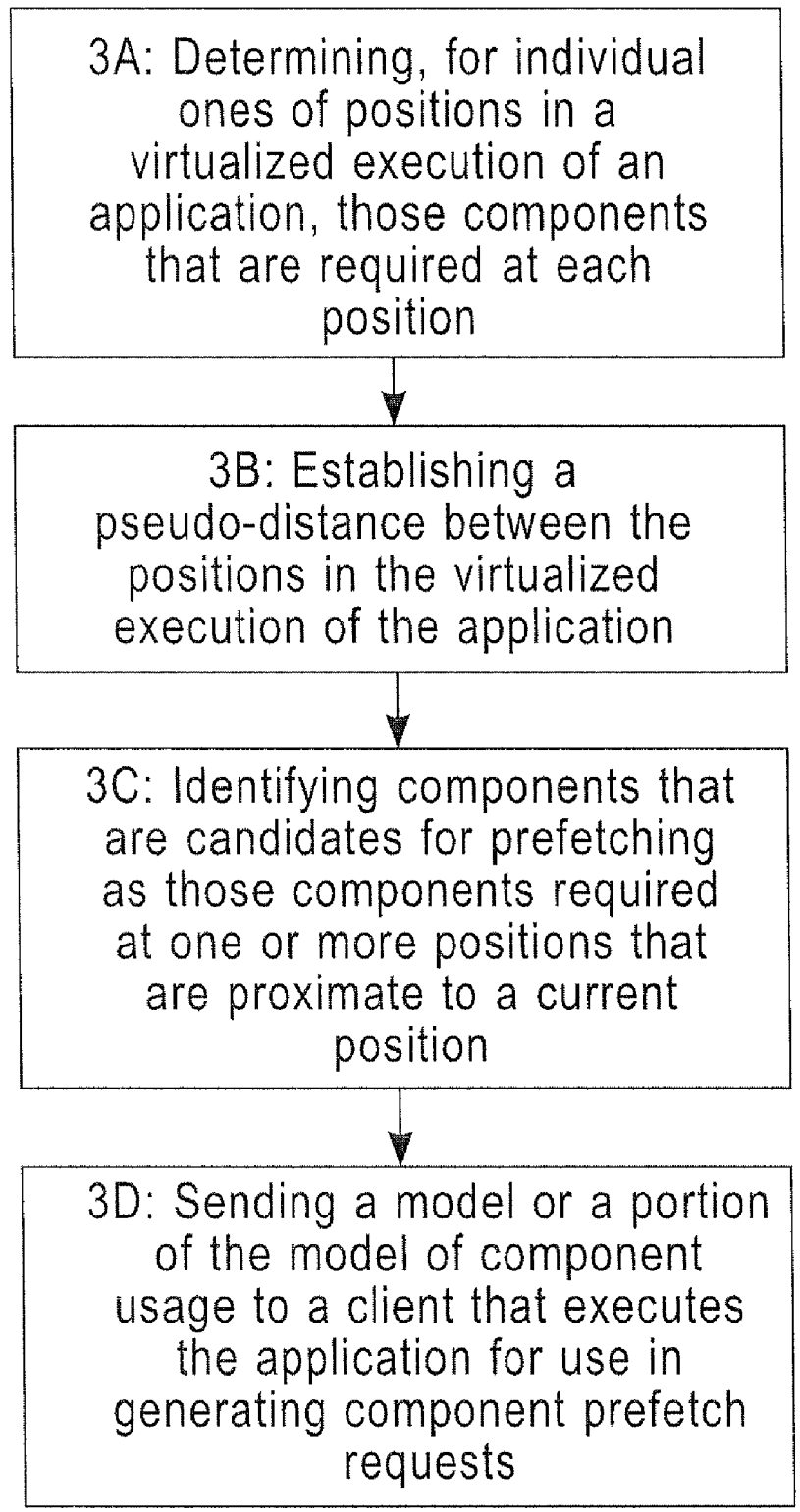
FIG. 3 is a logic flow diagram that is illustrative of a method, and an operation of a computer program, in accordance with exemplary embodiments of this invention.

FIG. 3 is a logic flow diagram that is illustrative of a method, and an operation of a computer program, in accordance with exemplary embodiments of this invention. Based on the foregoing description it can be appreciated that the method includes, (Block 3A) for individual ones of positions in a virtualized execution of an application, determining those components that are required at each position; (Block 3B) establishing a pseudo-distance between the positions in the virtualized execution of the application; and (Block 3C) identifying components that are candidates for prefetching as those components required at one or more positions that are proximate to a current position. In one non-limiting embodiment determining and establishing are used for building a model of application component usage, and the method further includes (Block 3D) sending the model or a portion of the model to a client that executes the application for use in generating component prefetch requests prior to a time when at least a first component of a group of components is required.

It should be appreciated that the exemplary embodiments discussed above can be used in a number of virtualization embodiments and architectures, and is not limited for use in the one described above and shown in FIG. 1. In addition, the exemplary embodiments are well suited for use in systems similar to or based on the above-referenced PDS, which is a virtual execution environment and infrastructure designed specifically for deploying software, or "assets", on demand while enabling management from a central location. PDS intercepts a select subset of system calls on a target machine to provide a partial virtualization at the operating system level. This enables an asset's install-time environment to be reproduced virtually while otherwise not isolating the asset from peer applications on the target machine. Asset components, or "shards", are fetched as they are needed (or they may be pre-fetched), enabling the asset to be progressively deployed by overlapping deployment with execution. Cryptographic digests, or other shard naming schemes, can be used to eliminate redundant shards within and among assets, which enables more efficient deployment. A framework is provided for intercepting interfaces above the operating system (e.g., Java class loading), enabling optimizations requiring semantic awareness not present at the OS level. Reference may also be made to US Patent Application No.: 2006/0047974, incorporated by reference herein.

The foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent logical structures, other than a tree structure, may be employed for constructing the model 16C may be attempted by those skilled in the art. However, all such and similar modifications of the teachings of this invention will still fall within the scope of the embodiments of this invention.

It should be noted that some of the features of the preferred embodiments of this invention may be used to advantage without the corresponding use of other features. As such, the foregoing description should be considered as merely illustrative of the principles, teachings and embodiments of this invention, and not in limitation thereof.

What is claimed is:

1. A method, comprising:

for individual ones of positions in a virtualized execution of an application, determining, by a data processor, components that are required at each position, where a position is a point at which the virtualized execution of the application requires at least one new component, and where a component is a decomposition of the application;

the data processor establishing a pseudo-distance between the positions in the virtualized execution of the application by hierarchical clustering of requests for components into a binary tree, where distances between leaves of the binary tree approximate pseudo-distances; and the data processor, using at least a portion of the binary tree, identifying components that are candidates for prefetching as those components required at one or more positions that are proximate to a current position;

where the pseudo-distance is a measure of a likelihood of moving from one position in the virtualized execution of the application to another position in the virtualized execution of the application within some period of time.

2. The method of claim 1, where the pseudo-distance between the positions is indicative of an urgency of prefetching candidate components, and further comprising regulating, by the data processor, an amount of resources devoted to the prefetching of components in accordance with the pseudo-distance.

3. The method of claim 1, where determining and establishing, by the data processor, are used for building a model of application component usage, and further comprising sending the model or a portion of the model to a client that executes the application for use in generating component prefetch requests prior to a time when at least a first component of a group of components is required.

4. The method of claim 1, where determining and establishing, by the data processor, are used for building a model of application component usage, and further comprising pushing components to a client that executes the application prior to a time when at least a first component of a group of components is required.

5. The method of claim 1, where determining and establishing, by the data processor, are used for building a model of application component usage, the model comprising a tree structure constructed having positions as leaves and internal nodes that represent a hierarchy of phases of execution of the application, where descendants of a given node represent positions or sub-phases within the phase, where the pseudo-distance between positions is approximated by closeness in the tree, and where each node of the tree comprises a set of components required by its descendants for specifying components as candidates for prefetching.

6. A tangible computer-readable storage medium storing data representing program instructions, the execution of which by at least one processor results in operations comprising:

for individual ones of positions in a virtualized execution of an application, determining components that are required at each position, where a position is a point at which the virtualized execution of the application requires at least one new component, and where a component is a decomposition of the application;

establishing a pseudo-distance between the positions in the virtualized execution of the application by hierarchical clustering of requests for components into a binary tree, where distances between leaves of the binary tree approximate pseudo-distances; and identifying, using at least a portion of the binary tree, components that are candidates for prefetching as those components required at one or more positions that are proximate to a current position;

where the pseudo-distance is a measure of a likelihood of moving from one position in the virtualized execution of the application to another position in the virtualized execution of the application within some period of time.

7. The tangible computer-readable storage medium of claim 6, where the pseudo-distance between the positions is indicative of an urgency of prefetching candidate components, and further comprising an operation of regulating an amount of resources devoted to the prefetching of components in accordance with the pseudo-distance.

8. The tangible computer-readable storage medium of claim 6, where the operations of determining and establishing comprise an operation of building a model at a server component of application component usage, and further comprising an operation of sending the model or a portion of the model to at least one client component that executes the application for use in generating component prefetch requests prior to a time when at least a first component of a group of components is required.

9. The tangible computer-readable storage medium of claim 6, where the operations of determining and establishing comprise an operation of building a model at a server component of application component usage, and further comprising an operation of pushing components to a client component that executes the application prior to a time when at least a first component of a group of components is required.

10. The tangible computer-readable storage medium of claim 6, where the operations of determining and establishing comprise an operation of building a model of application component usage, the model comprising a tree structure constructed having positions as leaves and internal nodes that represent a hierarchy of phases of execution of the application, where descendants of a given node represent positions or sub-phases within the phase, where the pseudo-distance between positions is approximated by closeness in the tree, and where each node of the tree comprises a set of components required by its descendants for specifying components as candidates for prefetching.

11. The tangible computer-readable storage medium of claim 6, located at a server component in a virtual execution environment, where the operations of determining and establishing use traces of prefetch requests that are at least one of: received from at least one client component, and made to a local cache at the client component.

12. A server of a virtual execution environment that comprises at least one client, comprising:
 a network interface for conducting bidirectional communications with the at least one client; and
 a memory, coupled to the network interface;
 a data processor, coupled to the memory, configured to determine, for individual ones of positions in a virtualized execution of an application, components that are required at each position, where a position is a point at which the virtualized execution of the application requires at least one new component, and where a component is a decomposition of the application;
 to establish a pseudo-distance between the positions in the virtualized execution of the application by hierarchical clustering of requests for components into a binary tree, where distances between leaves of the binary tree approximate pseudo-distances: and
 to identify, using at least a portion of the binary tree, components that are candidates for prefetching as those components required at one or more positions that are proximate to a current position, where the pseudo-distance between positions is indicative of an urgency of prefetching candidate components for regulating an amount of resources devoted to the prefetching of components;
 where the pseudo-distance is a measure of a likelihood of moving from one position in the virtualized execution of the application to another position in the virtualized execution of the application within some period of time.

13. The server of claim 12, where said control unit builds a model of application component usage and is further configured to sending the model or a portion of the model to the at least one client for use by the at least one client in generating component prefetch requests to the server prior to a time when at least a first component of a group of components is required.

14. The server of claim 12, where said control unit builds a model of application component usage and is further configured to push components to the at least one client prior to a time when at least a first component of a group of components is required.

15. The server of claim 12, where said control unit builds a model of application component usage, the model comprising a tree structure constructed having positions as leaves and internal nodes that represent a hierarchy of phases of execution of the application, where descendants of a given node represent positions or sub-phases within the phase, where the pseudo-distance between positions is approximated by closeness in the tree, and where each node of the tree comprises a set of components required by its descendants for specifying components as candidates for prefetching.

* * * * *